(12) United States Patent
Heighway et al.

(10) Patent No.: US 6,643,723 B1
(45) Date of Patent: Nov. 4, 2003

(54) METHOD AND APPARATUS FOR RELEASING BUS CONTROL BY A DEVICE CONNECTED TO THE BUS

(75) Inventors: Timothy Heighway, Northampton (GB); Klaus Gaedke, Hannover (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/913,683

(22) PCT Filed: Feb. 21, 2000

(86) PCT No.: PCT/EP00/01413

§ 371 (c)(1),
(2), (4) Date: Nov. 20, 2001

(87) PCT Pub. No.: WO00/52899

PCT Pub. Date: Sep. 8, 2000

(30) Foreign Application Priority Data

Mar. 3, 1999 (EP) .............................................. 99250060

(51) Int. Cl.$^7$ ................................................ G06F 13/00
(52) U.S. Cl. ......................... 710/107; 710/11; 370/249; 370/447; 370/481; 370/459
(58) Field of Search ................................ 710/107–125, 710/305–317, 11; 370/249, 447, 451, 459

(56) References Cited

U.S. PATENT DOCUMENTS

| | | | |
|---|---|---|---|
| 5,167,019 A | * 11/1992 | Fava et al. ................... | 709/240 |
| 5,274,700 A | * 12/1993 | Gechter et al. ......... | 379/211.01 |
| 5,579,486 A | * 11/1996 | Oprescu et al. ............. | 710/107 |
| 5,802,057 A | 9/1998 | Duckwall et al. ........... | 370/408 |
| 5,815,678 A | * 9/1998 | Hoffman et al. ............. | 710/305 |
| 5,845,097 A | 12/1998 | Kang et al. .................. | 395/297 |
| 5,919,261 A | * 7/1999 | Aoki et al. .................. | 713/300 |
| 6,032,211 A | * 2/2000 | Hewitt ....................... | 710/107 |
| 6,519,223 B1 | * 2/2003 | Wager et al. ................ | 370/216 |
| 2002/0167905 A1 | * 11/2002 | Wenzel et al. .............. | 370/249 |

OTHER PUBLICATIONS

American National Institute/Institute of Electrical and Electronics Engineers: "Logical Link Control—Std 802.2", 2984, IEEE, New York, USA pp. 68–79.

* cited by examiner

*Primary Examiner*—Rupal Dharia
(74) *Attorney, Agent, or Firm*—Joseph S. Tripoli; Paul P. Kiel

(57) ABSTRACT

In a digital bus, such as the IEEE 1394 serial bus, the procedure for sending data from a link layer IC onto the data bus is that the link layer IC requests access to the bus and then waits until the physical layer IC grants the desired access. Upon detecting the grant status, the link layer IC is free to send data onto the bus. But if in the meantime the link layer IC refrains from sending data onto the bus, the granted bus access will not be given up. As a consequence the bus is blocked for an indefinite time period because the bus access granted cannot be overwritten by the physical layer IC. According to the invention an additional timer function is implemented in the link layer IC. This 'bus grant missed' timer function controls the link layer IC in such a way that it automatically gives back the bus control to the physical layer IC after a predetermined time period has elapsed during which the link layer IC has sent no data onto the bus.

3 Claims, 2 Drawing Sheets

METHOD AND APPARATUS FOR RELEASING BUS CONTROL BY A DEVICE CONNECTED TO THE BUS

Figure 1:
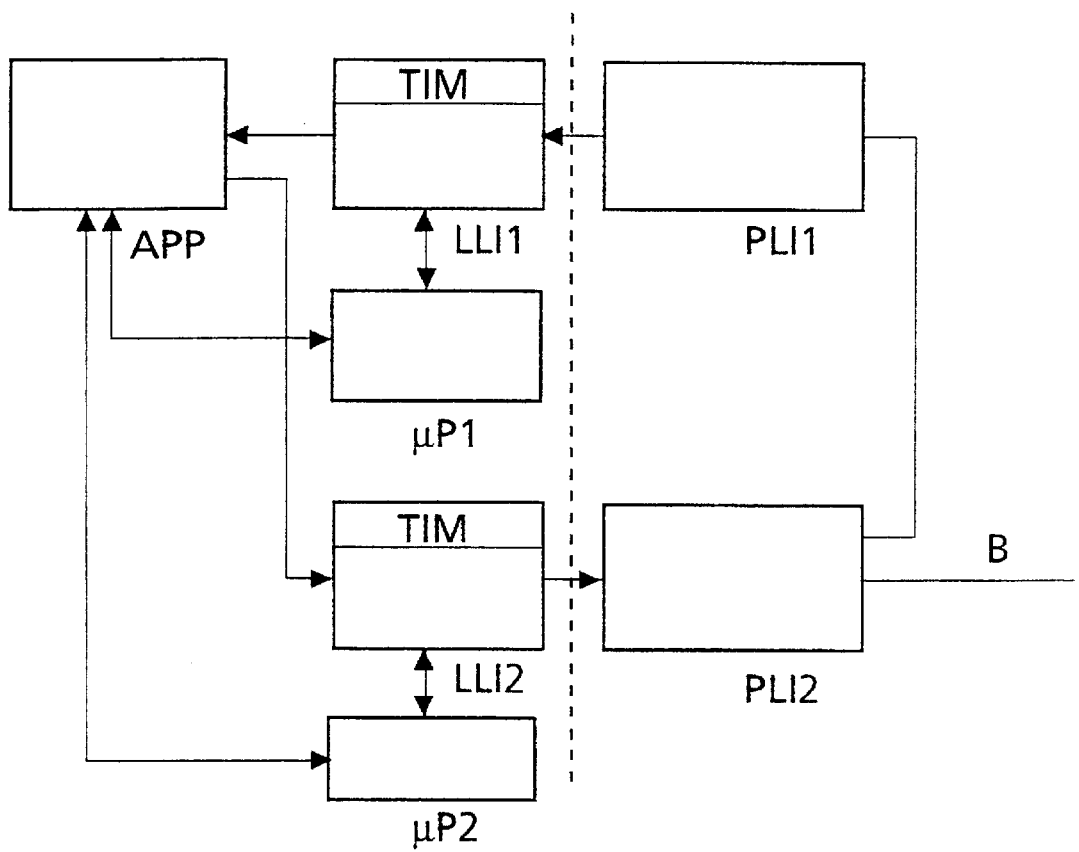

This application claims the benefit of EPO application serial No. 99250060.3 filed Mar. 3, 1999, which is hereby incorporated herein by reference, and which claims the benefit under 35 U.S.C. §365 of International Application PCT/EP00/01413, filed Feb. 21, 2000, which was published in accordance with PCT Article 21(2) on Sep. 8, 2000 in English.

The present invention relates to a method and to an apparatus for transferring data on a bus to or from a device to be controlled by said bus, wherein bus blocking is to be avoided.

BACKGROUND

The IEEE1394 bus is a low cost, high performance serial bus. It has a read/write memory architecture and a highly sophisticated communication protocol. Data rates of 100, 200 or 400 Mbit/s can be transmitted in nearly real time. Simultaneously, data can be transmitted bi-directionally. The first ten bits of transmitted address values refer to one of up to 1023 possible IEEE1394 bus clusters. The following six bits of the transmitted address values refer within a specific cluster to one of up to 63 nodes to which an application or device is assigned. Data between nodes can be exchanged without interaction of a host controller. Devices can be connected to or disrupted from the network at any time, allowing a plug and play behaviour.

The standardised cable connection for the nodes has a length of 4.5 m and contains three twisted cable pairs of which two pairs serve for data and control information transmission and the further pair carries supply voltages of 8V to 40V. Three level coding is used: HIGH (H), LOW (L), and HIGH IMPEDANCE (Z). H overrides L, L overrides Z. The characteristic impedance is 110 Ω. There is also a version IEEE1394–1995 of the bus specification including only two twisted pairs of cables on which no power supply voltage is present. The communication protocol has three layers: physical layer, link layer, and transaction layer. Typically, the transaction layer is realised by firmware whereas the other layers are implemented using chip sets.

The physical layer contains analog transceivers and a digital state machine. It handles bus auto-configuration and hot plug. It reclocks, regenerates and repeats all packets and forwards all packets to the local link layer. It carries out packet framing, for example speed code, prefix, and packet end assembling. It arbitrates and transmits packets from the local link layer. Available IC types are e.g. TSB11C01, TSB11LV01, TSB21LV03, and TSB41LV03 of Texas Instruments, MB86611 of Fujitsu, and 21S750 of IBM.

The link layer performs all digital logic. It recognises packets addressed to the node by address recognition and decodes the packet headers. It delivers packets to higher layers and generates packets from higher layers. It works either isochronous for AV data use or asynchronous for control data use.

In the isochronous mode a channel having a guaranteed bandwidth is established. There is a defined latency. The transmission is performed in 125 μs time slots or cycles. Headers and data blocks of a packet have separate CRCs (cyclic redundancy check). This mode has a higher priority than the asynchronous data transfer mode.

The asynchronous mode is not time critical, but safe. It operates as an acknowledged service with a busy and retry protocol. Fixed addresses are used. Transmission takes place when the bus is idle. The asynchronous mode handles read request/response, write request/response, and lock request/response. It performs cycle control, CRC generation and validation. Available link layer IC types are e.g. TSB12C01A, TSB12LV21, TSB12LV31, and TSB12LV41 of Texas Instruments, and PDI1394L11 of Philips.

The transaction layer implements asynchronous bus transactions:

Read request/read response

Write request/write response

Lock request/lock response

As mentioned above it can be implemented by software running on a microcontroller, such as e.g. the 1960 of SparcLite. There may also be an AV (audio video) layer carrying out device control, connection management, timestamping, and packetising.

INVENTION

A link layer IC implements the interface to an external application, e.g. a VCR, and prepares IEEE1394 data for sending on the IEEE1394 bus, or interprets incoming IEEE1394 data packets from the IEEE1394 bus. A physical layer IC implements the direct electrical connection to the bus and controls many functions as mentioned above, including arbitration for sending data on the bus. The procedure for sending data from a link layer IC onto the bus is that the link layer IC requests access to the bus and then waits until the physical layer IC grants the desired access. Upon detecting the grant status, the link layer IC is free to send data onto the bus. But if in the meantime the link layer status has changed, i.e. the link layer IC refrains from sending data onto the bus, the granted bus access will not be given up according to the current IEEE1394 bus specification. As a consequence the bus is blocked for an indefinite time period because the bus access granted cannot be overwritten by the physical layer IC. A bus lock-up is very serious and means that the whole bus is jammed, no other node can get access to the bus to send data.

According to the invention an additional timer function is implemented in the link layer IC. This 'bus grant missed' timer function controls the link layer IC in such a way that it automatically gives back the bus control to the physical layer IC after a predetermined fixed time period has elapsed during which the link layer IC has sent no data onto the bus. The predetermined fixed time period can be user programmable in order to adapt it to a given bus configuration or application, respectively.

It is one object of the invention to disclose a method for avoiding bus blocking in case a granted bus access in not used for sending data onto the bus. This object is achieved by the method disclosed in claim 1.

It is a further object of the invention to disclose an apparatus which utilises the inventive method. This object is achieved by the apparatuses disclosed in claim 3.

In principle, the inventive method is suited for transferring data on a bus to or from a device to be controlled by said bus, wherein for interfacing between the bus and said device a physical layer IC and a link layer IC are used and wherein said physical layer IC generates a grant signal in order to give to said link layer IC access to said bus for sending data onto said bus and until said link layer IC has finished sending said data onto said bus following said grant signal, said bus remains occupied by said link layer IC, wherein said link layer IC includes a timer function which in case said physical layer IC grants to said link layer IC access for sending data onto said bus but said link layer IC does not send data onto said bus, generates a link release signal in order to release the link layer IC bus occupation after a predetermined time period following said grant signal has elapsed.

Advantageous additional embodiments of the inventive method are disclosed in the respective dependent claim.

In principle the inventive bus interface is suited for transferring data to or from a device to be controlled by the bus, and includes:

a link layer IC for connection to said device;
a physical layer IC for connection to said bus, wherein said physical layer IC generates a grant signal in order to give to said link layer IC access to said bus for sending data onto said bus and wherein, until said link layer IC has finished sending said data onto said bus following said grant signal, said link layer IC keeps said bus occupied;
a timer included in said link layer IC which in case said physical layer IC grants to said link layer IC access for sending data onto said bus but said link layer IC does not send data onto said bus, generates a link release signal in order to release the link layer IC bus occupation after a predetermined time period following said grant signal has elapsed.

Advantageous additional embodiments of the inventive apparatus are disclosed in the respective dependent claim.

DRAWINGS

Figure 2:
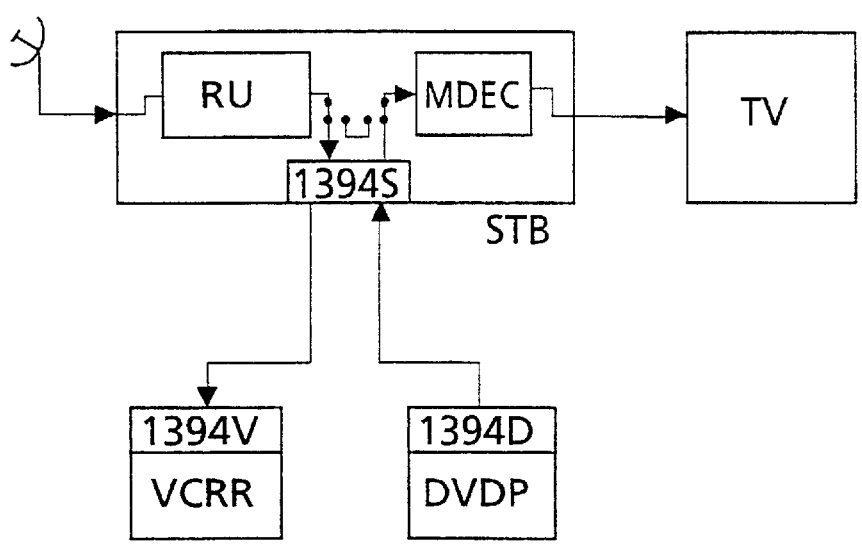
Figure 3:
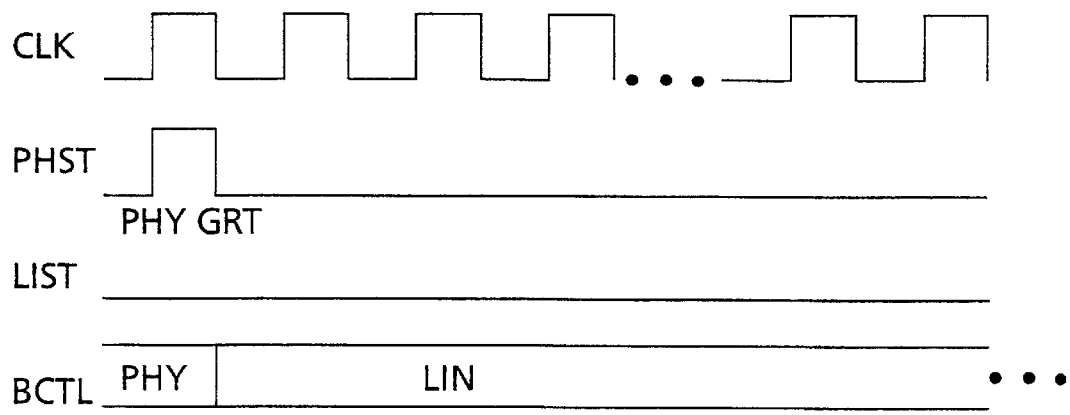
Figure 4:
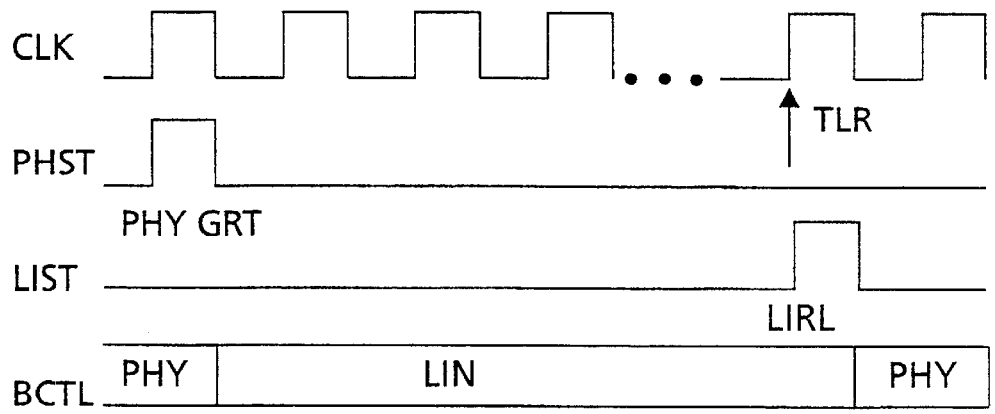

Embodiments of the invention are described with reference to the accompanying drawings, which show in:

FIG. 1 IEEE1394 double-node for bi-directional real-time video applications;

FIG. 2 an IEEE1394 bus-connected set-top box, VCR and DVD player;

FIG. 3 a blocked bus;

FIG. 4 a bus in which blocking is prevented.

EMBODIMENTS

In FIG. 1 a first physical layer IC PLI1 is connected via an IEEE1394 bus cable connection to a second physical layer IC PLI2 which itself is also connected to the further IEEE1394 bus cable B. PLI1 is at the other side assigned to a first link layer IC LLI1 for data input, and PLI2 is assigned to a second link layer IC LLI2 for data output. LLI1 and LLI2 are both assigned to the same application device APP. LLI1 and PLI1 via LLI1 are controlled by a first microcontroller μP1. LLI2 and PLI2 via LLI2 are controlled by a second microcontroller μP2. Application device APP can be controlled by μP1 and μP2, or by one of them. In both cases μP1 and μP2 may interact with each other (not depicted).

The invention can e.g. be used for an application as depicted in FIG. 2: A set-top box STB with receiving unit RU, MPEG decoder MDEC and IEEE1394 interface 1394S receives a digital TV program via satellite or cable. The receiving unit output signal is transmitted via IEEE1394 bus for the purpose of recording to a video recorder VCRR including also a IEEE1394 interface 1394V. Simultaneously, a DVD player DVDP replays a DVD disc and the DVD data is also transported via an IEEE1394 bus interface 1394D to the IEEE1394 bus interface 1394S of the set-top box in order to be decoded by the MPEG decoder MDEC and to be displayed on the screen of a television receiver TV. TV may still have an analog signal connection to the set-top box, but may also be connected to STB by an IEEE1394 bus interface. So, the set-top box IEEE1394 bus node 1394S needs a bi-directional functionality.

In FIG. 3 the clock CLK, the status of the physical layer PHST, the status LIST of a link layer IC and the bus control BCTL time periods of the physical layer and of the link layer IC are depicted. A physical layer IC grants bus access to a link layer IC by sending a PHYGRT bit or impulse. Thereafter bus control for sending data is assigned to that link layer IC. After sending data onto the bus the link layer IC would signal to the physical layer IC that it needs no longer bus access whereupon the physical layer could give access to another device demanding bus access. However, as long as the link layer IC does not send data onto the bus, for example because a user has switched off that device in the meantime, the bus will be blocked for the physical layer IC and for all other devices connected to the bus.

In order to avoid such situation an additional timer function is added to the link layer IC which sends a link release bit or impulse LIRL after a predetermined time period, beginning basically with PHYGRT, has elapsed. LIRL is sent in correlation with e.g. slope TLR of clock CLK, as depicted in FIG. 4. As a consequence, the bus control BCTL is given back to the physical layer. The other details of FIG. 4 correspond to that of FIG. 3. The corresponding timer TIM is shown in the block diagram of FIG. 1.

The invention can also be used to achieve spike protection. It can happen that the physical layer IC grants unintended bus access to the link layer IC because of spike signals on control signals of the physical layer/link layer IC connection. Also in such cases the above described timer function on the link layer IC ensures that, even though the link layer IC didn't request bus access, the bus is released again by the link layer IC after a predetermined time period has elapsed. That time period may differ from the above described time period, according to the current application or bus environment. The length of the time period is then controlled by the presence or absence of a prior bus request from the link layer IC.

What is claimed is:

1. Method for transferring bus data to or from a device to be controlled by an IEEE1394 bus, wherein for interfacing between said bus and said device a physical layer integrated circuit ("IC") and a link layer IC are used and wherein, upon request from said link layer IC, said physical layer IC generates a grant signal in order to give to said link layer IC access to said bus for sending data onto said bus and wherein, until said link layer IC has finished sending said data onto said bus following said grant signal, said bus remains in an occupied status wherein said link layer IC includes a timer function which, in case said physical layer IC grants upon request from said link layer IC to said link layer IC access for sending data onto said bus but said link layer IC does not send data onto said bus, generates after the elapse of a first predetermined time period following said grant signal a link release signal for releasing the current bus occupation by said link layer IC and for automatically giving back the bus control to said physical layer IC, and wherein, following unintended grant of bus access to said link layer IC because of spike signals on control signals of said bus, said timer function generates after the elapse of a second predetermined time period following said grant signal a link release signal for releasing the current bus occupation by said link layer IC and for automatically giving back the bus control to said physical layer IC, and wherein the length of said first or said second time period is controlled by the presence or absence of a prior bus request from said linklayer IC.

2. Bus interface for transferring bus data to or from a device to be controlled by an IEEE1394 bus, including:

a link layer integrated circuit ("IC") for the connection to said device;

a physical layer IC for the connection to said bus, wherein, upon request from said link layer IC, said physical layer IC generates a grant signal in order to give to said link layer IC access to said bus for sending data onto said bus and wherein, until said link layer IC has finished sending said data onto said bus following said grant signal, said bus remains in an occupied status comprising:

a timer included in said link layer IC which, in case said physical layer IC grants upon request from said link layer IC to said link layer IC access for sending data onto said bus but said link layer IC does not send data onto said bus, generates after the elapse of a first predetermined time period following said grant signal a link release signal for releasing the current bus occupation by said link layer IC and for automatically giving back the bus control to said physical layer IC, and wherein, following unintended grant of bus access to said link layer IC because of spike signals on control signals of said bus, said timer generates after the elapse of a second predetermined time period following said grant signal a link release signal for releasing the current bus occupation by said link layer IC and for automatically giving back the bus control to said physical layer IC, and wherein the length of said first or said second time period is controlled by the presence or absence of a prior bus request from said link layer IC.

3. Bus interface according to claim 2, including two such link layer IC/physical layer IC pairs.

* * * * *